United States Patent
Joo et al.

(10) Patent No.: US 12,451,277 B2
(45) Date of Patent: Oct. 21, 2025

(54) NON-ORIENTED ELECTRICAL STEEL SHEET AND METHOD FOR MANUFACTURING SAME

(71) Applicant: POSCO, Pohang-si (KR)

(72) Inventors: Hyung Don Joo, Pohang-si (KR); Il-Nam Yang, Pohang-si (KR); Junesoo Park, Pohang-si (KR); Chang Soo Park, Pohang-si (KR)

(73) Assignee: POSCO, Pohang-si (KR)

( * ) Notice: Subject to any disclaimer, the term of this patent is extended or adjusted under 35 U.S.C. 154(b) by 636 days.

(21) Appl. No.: 17/786,508

(22) PCT Filed: Dec. 17, 2020

(86) PCT No.: PCT/KR2020/018609
§ 371 (c)(1),
(2) Date: Jul. 21, 2022

(87) PCT Pub. No.: WO2021/125855
PCT Pub. Date: Jun. 24, 2021

(65) Prior Publication Data
US 2023/0025678 A1      Jan. 26, 2023

(30) Foreign Application Priority Data

Dec. 20, 2019   (KR) .................. 10-2019-0172471

(51) Int. Cl.
*H01F 1/147*     (2006.01)
*C21D 1/06*      (2006.01)
(Continued)

(52) U.S. Cl.
CPC .......... *H01F 1/14775* (2013.01); *C21D 1/06* (2013.01); *C21D 6/005* (2013.01); *C21D 6/008* (2013.01);
(Continued)

(58) Field of Classification Search
CPC ... C21D 1/06; C21D 1/76; C21D 1/78; C21D 6/005; C21D 6/008; C21D 8/1222;
(Continued)

(56) References Cited

U.S. PATENT DOCUMENTS

2013/0167987 A1    7/2013   Kim et al.
2015/0059929 A1    3/2015   Zaizen et al.

FOREIGN PATENT DOCUMENTS

CN      1078270 A    11/1993
CN      1308143 A     8/2001
(Continued)

OTHER PUBLICATIONS

English machine translation of KR-20160044452-A of Joo (Year: 2016).*

(Continued)

*Primary Examiner* — Keith D. Hendricks
*Assistant Examiner* — Mayela Aldaz
(74) *Attorney, Agent, or Firm* — Morgan Lewis & Bockius LLP

(57) ABSTRACT

A non-oriented electrical steel sheet according to an embodiment of the present invention includes, in wt %, Si: 2.2 to 4.5%, Mn: 0.5% or less (excluding 0%), Al: 0.001 to 0.5%, Sn: 0.07 to 0.25%, and N: 0.0010 to 0.0090%, and the balance of Fe and inevitable impurities.
A surface layer portion existing in an inner direction from a surface of the steel sheet and a central portion existing inside the surface layer portion are included, and the central portion includes N at 0.005 wt % or less, and the surface layer portion further includes N at 0.001 wt % or more compared to the central portion; and the surface layer portion has an average grain size of 60 μm or less, while the central portion has an average grain size of 70 to 300 μm.

10 Claims, 1 Drawing Sheet

(51) Int. Cl.

| | | |
|---|---|---|
| *C21D 6/00* | (2006.01) | |
| *C21D 8/12* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C23C 8/26* | (2006.01) | |
| *C23C 8/80* | (2006.01) | |
| *H01F 41/02* | (2006.01) | |

(52) U.S. Cl.
CPC ......... *C21D 8/1222* (2013.01); *C21D 8/1233* (2013.01); *C21D 8/1255* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C23C 8/26* (2013.01); *C23C 8/80* (2013.01); *H01F 41/02* (2013.01); *C22C 2202/02* (2013.01)

(58) Field of Classification Search
CPC .. C21D 8/1233; C21D 8/1255; C21D 8/1261; C21D 8/1272; C21D 8/1283; C21D 9/46; C22C 2202/02; C22C 38/001; C22C 38/002; C22C 38/004; C22C 38/008; C22C 38/02; C22C 38/04; C22C 38/06; C22C 38/08; C22C 38/12; C22C 38/16; C22C 38/38; C22C 38/60; C23C 8/26; C23C 8/80; H01F 1/14775; H01F 41/02; Y02T 10/64
See application file for complete search history.

(56) References Cited

FOREIGN PATENT DOCUMENTS

| | | |
|---|---|---|
| CN | 105849300 A | 8/2016 |
| CN | 110073021 A | 7/2019 |
| JP | H06-330260 A | 11/1994 |
| JP | H10-324957 A | 12/1998 |
| JP | 2000-017334 A | 1/2000 |
| JP | 2000-054085 A | 2/2000 |
| JP | 2001-279402 A | 10/2001 |
| JP | 4306445 B2 | 8/2004 |
| JP | 2005120403 A * | 5/2005 |
| JP | 2008-031490 A | 2/2008 |
| JP | 2012-036455 A | 2/2012 |
| JP | 2013-010982 A | 1/2013 |
| JP | 2013-189693 A | 9/2013 |
| JP | 2014-173099 A | 9/2014 |
| JP | 2018-165383 A | 10/2018 |
| JP | 2019-178372 A | 10/2019 |
| JP | 2019-178373 A | 10/2019 |
| KR | 1998-0080378 A | 11/1998 |
| KR | 10-0721817 B1 | 5/2007 |
| KR | 10-0797895 B1 | 1/2008 |
| KR | 2011-0005583 A | 1/2011 |
| KR | 2011-0119101 A | 11/2011 |
| KR | 10-1203791 B1 | 11/2012 |
| KR | 10-1227767 B1 | 1/2013 |
| KR | 2015-0073798 A | 7/2015 |
| KR | 2015-0093807 A | 8/2015 |
| KR | 20160044452 A * | 4/2016 |
| KR | 10-1650849 B1 | 7/2016 |
| KR | 10-1918720 B1 | 11/2018 |
| KR | 2019-0077984 A | 7/2019 |
| WO | 2007-069776 A1 | 6/2007 |

OTHER PUBLICATIONS

Office Action and Search report issued in Chinese Patent Application 202080097258.1 dated May 7, 2023.

The Extended European Search Report dated May 10, 2023 issued in European Patent Application No. 20901250.9.

International Search Report and Written Opinion issued in corresponding International Patent Application No. PCT/KR2020/018609 dated Dec. 17, 2020.

Japanese Office Action dated Oct. 3, 2023 issued in Japanese Patent Application No. 2022-538103.

* cited by examiner

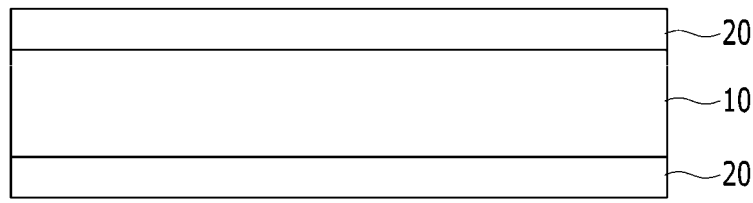

NON-ORIENTED ELECTRICAL STEEL SHEET AND METHOD FOR MANUFACTURING SAME

CROSS-REFERENCE OF RELATED APPLICATIONS

This application is the U.S. National Phase under 35 U.S.C. § 371 of International Patent Application No. PCT/KR2020/018609, filed on Dec. 17, 2020, which in turn claims the benefit of Korean Application No. 10-2019-0172471, filed on Dec. 20, 2019, the entire disclosures of which applications are incorporated by reference herein.

TECHNICAL FIELD

An embodiment of the present invention relates to a non-oriented electrical steel sheet and a manufacturing method thereof. Specifically, an embodiment of the present invention relates to a non-oriented electrical steel sheet and a manufacturing method thereof that may improve magnetism by appropriately adding Si and Sn, and improving texture through nitriding.

BACKGROUND ART

A non-oriented electrical steel sheet is used as a material for an iron core in rotary devices such as motors and generators, and stationary devices such as small transformers, and plays an important role in determining energy efficiency in electric devices. The representing characteristics of the electrical steel sheet may include iron loss and magnetic flux density, wherein it is preferable that the iron loss becomes smaller and the magnetic flux density becomes higher, and this is because when a magnetic field is induced as the iron loss becomes small the energy being lost in the form of heat can be reduced, and as the magnetic flux density becomes high a larger magnetic field can be induced with the same amount of energy. In recent electric devices, their use in a high frequency range is increasing for the purpose of high efficiency and down-sizing, and in particular, a driving motor for an environmentally-friendly vehicle such as an electric vehicle is strongly required to improve magnetism in the high frequency range of 400 Hz or higher, and as a speed thereof increases, the iron loss of several to several tens of kHz becomes important. In a case of a motor for a vehicle, it is particularly good that both high frequency iron loss and low frequency iron loss are excellent. Si, Al, Mn, and the like, which are alloy elements with high specific resistance, are added to reduce the high-frequency iron loss, but according to this method, although iron loss is reduced, there is a problem in that saturation magnetic flux density also decreases. In addition, when too much Si is added, workability is lowered, cold rolling becomes difficult, and productivity is lowered, and when too much Al, Mn, and the like are added, rollability is lowered, hardness increases, and workability is also lowered. In addition, in a case of a silicon steel sheet of 6.5 wt % or more, cold workability deteriorates, so that production by general cold rolling is impossible, and thus a siliconizing method and the like must be used. In addition, there is a method of manufacturing the steel sheet to have a very thin thickness, but the thinner the steel sheet, the higher the production cost, and the production cost increases due to difficulty of manufacturing a motor itself and an increase in the number of laminates even when manufacturing the motor. In order to improve the magnetic flux density and the iron loss, a method for improving the texture has also been proposed. A method of performing annealing so that selective crystal growth of (100) grains is made on a surface of a cold-rolled steel sheet, so that a surface of the annealed sheet is made in a (100) [0vw] crystal orientation, has been proposed. Hereinafter, the crystal orientation is indicated by the Miller index. When the crystal orientation is expressed as {hkl}<uvw> or (hkl) [uvw], {hkl} is a plane index of a crystal plane parallel to a surface orientation, and <uvw> represents a crystal direction parallel to a rolling direction. Herein, h, k, l, u, v, and w are integers. In this technology, all grain sizes are larger than the thickness, and have a structure penetrating the thickness. Since the non-oriented electrical steel sheet is manufactured as complex shapes such as motor cores through punching processing, when the grain size is excessively large, the workability is very poor. In addition, a method for forming a {100} plane parallel to a surface of a metal plate has been presented on the surface of the metal plate. The method for forming the {100} surface of the surface of the metal plate includes: reducing oxygen in at least one of an inner region and a surface region of the metal plate or heat-treating the metal plate under a temperature at which an austenite phase is stable while blocking the metal plate from external oxygen; and phase-transforming the heat-treated metal plate into a ferrite phase. This method requires a vacuum heat treatment that is difficult to implement industrially because it is necessary to block oxygen from the outside, and it requires a lot of heat treatment time, so it is a very difficult process for industrial success. However, in the case of iron loss, it may be expressed as a sum of hysteresis loss, eddy current loss, and abnormal eddy current loss, while in the case of high-frequency characteristics, a ratio of eddy current loss increases, so a method other than texture control, which is important for hysteresis loss, is required. Factors that significantly affect the eddy current loss include resistivity, a sheet thickness, and a grain size. The resistivity and thickness of the steel sheet are as described above. Regarding the grain size, the eddy current loss decreases when the grain size decreases. However, as the grain size decreases, the hysteresis loss increases, and accordingly, an optimum grain size is set. Considering the iron loss according to frequency, it is generally known that the optimum grain size of a steel sheet for a high frequency motor is smaller than the optimum grain size of a general low frequency therefor. In addition, as the frequency increases, the eddy current is mainly formed on the surface due to the skin depth effect, so that it is necessary to refine the surface grains or increase the surface resistivity. When a high-frequency current flows, the current is concentrated on a surface of a conductor, and a depth at which 1/e (36.5%) of the surface current flows is called the skin depth. $\delta=(2\rho/\mu\omega)^{\wedge}0.5-503.3*(\rho/\mu rf)^{\wedge}0.5$ $\delta$: skin depth [m], $\rho$: electrical resistivity [$\Omega$m], $\mu r$: relative permeability, f: frequency In the case of Si-containing iron, the approximate skin depth is 200 μm at 50 Hz, while it becomes thinner at 100 μm at 400 Hz and 35 μm at 2000 Hz. Accordingly, when the grains in the surface layer are made to be small, the eddy current loss is reduced, so that the formation of the eddy current formed on the surface at the high frequency is prevented, and thus the high frequency iron loss may be improved. In addition, it is possible to reduce the iron loss by reducing the hysteresis loss by increasing the central grain size, and particularly, it is possible to improve the low frequency iron loss, or at least to prevent deterioration. As a method of improving high-frequency characteristics, a method of forming a nitride and/or internal oxide-containing layer of which an average particle diameter of nitrides and/or internal oxides deep from the surface layer of the steel sheet in the surface layer of the steel sheet and an area ratio in a cross-section of the sheet thickness are regulated within a predetermined range, and of regulating an area ratio of nitrides and internal oxides present in regions other than at the nitride and/or internal oxide-containing layer within the sheet thickness cross-section and an average grain diameter D of the steel sheet within a predetermined range, has been known. However, in this method, it has been reported that the production state of the nitrides and internal oxides and their average particle diameters were controlled by adjusting the annealing temperature, annealing time, and annealing atmosphere ($N_2$ concentration, dew point, and the like). Particularly, the particle diameters of the internal oxides and nitrides were mainly controlled by changing the annealing temperature and annealing time, the formation depths of the internal oxide-containing layer and the nitride-containing layer were mainly controlled by changing the annealing time and annealing atmosphere, and the area ratios of the internal oxides and nitrides in the cross-section of the sheet thickness were mainly controlled by changing the annealing atmosphere and the annealing temperature. As described above, when the coarse oxides and nitrides are used, they must be contained in a very large amount to control the grain size, and it is difficult to efficiently control them in a short time.

DISCLOSURE

Description of the Drawings

Technical Problem

An embodiment of the present invention provides a non-oriented electrical steel sheet and a manufacturing method therefor. Specifically, an embodiment of the present invention provide a non-oriented electrical steel sheet and a manufacturing method thereof that may improve magnetism by appropriately adding Si and Sn, and improving texture through nitriding.

Technical Solution

A non-oriented electrical steel sheet according to an embodiment of the present invention includes, in wt %, Si: 2.2 to 4.5%, Mn: 0.5% or less (excluding 0%), Al: 0.001 to 0.5%, Sn: 0.07 to 0.25%, and N: 0.0010 to 0.0090%, and the balance of Fe and inevitable impurities.

A surface layer portion existing in an inner direction from a surface of the steel sheet and a central portion existing inside the surface layer portion are included, and the central portion includes N at 0.005 wt % or less, and the surface layer portion further includes N at 0.001 wt % or more compared to the central portion, and the surface layer portion has an average grain size of 60 μm or less, and the central portion has an average grain size of 70 to 300 μm. Specifically, an average grain size of the central portion may be 70 to 130 μm.

The non-oriented electrical steel sheet according to the embodiment of the present invention may further include one or more of C: 0.005 wt % or less and S: 0.003 wt % or less.

The non-oriented electrical steel sheet according to the embodiment of the present invention may further include one or more of Sb: 0.2 wt % or less and P: 0.1 wt % or less.

The non-oriented electrical steel sheet according to the embodiment of the present invention may further include one or more of Cu: 0.015 wt % or less, Ni: 0.05 wt % or less, Cr: 0.05 wt % or less, Zr: 0.01 wt % or less, Mo: 0.01 wt % or less, and V: 0.01 wt % or less.

The surface layer portion may include a nitride, and an average particle diameter of the nitride may be 10 to 100 nm.

An average grain size of the central portion may be twice or more an average grain size of the surface layer portion.

Among grains of the central portion, a fraction of grains having an angle between a {100} plane and a rolling surface of 15° or less may be 30% or more.

Among grains of the central portion, a fraction of grains having an orientation deviated of 15° or less from a {001}<012> orientation may be 20% or more.

An intensity of a {001}<012> orientation of the central portion may be 7 times or more random thereof when expressed as an orientation distribution function (ODF).

Among grains of the central portion, a fraction of grains having an angle between a {111} plane and a rolling surface of 15° or less may be 25% or less.

The non-oriented electrical steel sheet may satisfy $B_{50}/B_s \geq 0.84$.

($B_{50}$ represents a magnitude (Tesla) of magnetic flux density induced when a magnetic field of 5000 A/m is added, and $B_S$ represents a saturation magnetic flux density value (Tesla)).

In the non-oriented electrical steel sheet according to the embodiment of the present invention, $W_{15/50}$ may be 1.94 W/kg or less, and $W_{10/1000}$ may be 43 W/kg or less.

($W_{15/50}$ represents an average loss in a rolling direction and a direction perpendicular to the rolling direction when a magnetic flux density of 1.5 Tesla is induced at a frequency of 50 Hz, and $W_{10/1000}$ represents an average loss in the rolling direction and the direction perpendicular to the rolling direction when a magnetic flux density of 1.0 Tesla is induced at a frequency of 1000 Hz).

A manufacturing method of a non-oriented electrical steel sheet according to an embodiment of the present invention includes: hot-rolling a slab that includes, in wt %, Si: 2.2 to 4.5%, Mn: 0.5% or less (excluding 0%), Al: 0.001 to 0.5%, Sn: 0.07 to 0.25%, and N: 0.005% or less (excluding 0%), and the balance of Fe and inevitable impurities, to manufacture a hot-rolled sheet; cold-rolling the hot-rolled sheet to manufacture a cold-rolled sheet; and final annealing the cold-rolled sheet.

The final annealing includes: a step of nitriding-annealing and a step of annealing grain growth; when a temperature is increased for the nitriding-annealing of the cold-rolled sheet, a temperature increase rate from 300° C. to a nitriding-annealing temperature is 30° C./s or more; in the nitriding-annealing, an amount of nitriding is 10 to 80 ppm by weight; and a temperature of the annealing of the grain growth is 960 to 1200° C.

A final reduction ratio may be 60 to 88% in the manufacturing of the cold-rolled sheet.

A temperature of the nitriding-annealing may be 700 to 850° C.

The nitriding-annealing may be performed in an atmosphere containing ammonia, nitrogen, and hydrogen.

Advantageous Effects

According to the embodiment of the present invention, by differently controlling precipitates in a thickness direction by contents and nitriding of Si, Mn, Al, and Sn among alloy elements added to steel to control a grain size, it is possible to manufacture a non-oriented electrical steel sheet with excellent high-frequency iron loss and also excellent low-frequency iron loss.

In addition, it is possible to manufacture a non-oriented electrical steel sheet with an excellent strength value by nitriding and surface grain refinement.

BRIEF DESCRIPTION OF THE DRAWING

FIG. 1 illustrates a schematic view of a cross-section of a non-oriented electrical steel sheet according to an embodiment of the present invention.

MODE FOR INVENTION

It will be understood that, although the terms first, second, third, etc. may be used herein to describe various elements, components, regions, areas, zones, layers, and/or sections, they are not limited thereto. These terms are only used to distinguish one element, component, region, area, zone, layer, or section from another element, component, region, layer, or section. Therefore, a first part, component, region, area, zone, layer, or section to be described below may be referred to as second part, component, area, layer, or section within the range of the present invention.

The technical terms used herein are to simply mention a particular embodiment and are not meant to limit the present invention. An expression used in the singular encompasses an expression of the plural, unless it has a clearly different meaning in the context. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other features, regions, numbers, stages, operations, elements, components, and/or combinations thereof may exist or may be added.

When referring to a part as being "on" or "above" another part, it may be positioned directly on or above the other part, or another part may be interposed therebetween. In contrast, when referring to a part being "directly above" another part, no other part is interposed therebetween.

Unless otherwise stated, % means wt %, and 1 ppm is 0.0001 wt %.

In embodiments of the present invention, inclusion of an additional element means replacing the balance of iron (Fe) by an additional amount of the additional elements.

Unless otherwise defined, all terms used herein, including technical or scientific terms, have the same meanings as those generally understood by those with ordinary knowledge in the field of art to which the present invention belongs. Terms defined in commonly used dictionaries are further interpreted as having meanings consistent with the relevant technical literature and the present disclosure, and are not to be construed as having idealized or very formal meanings unless defined otherwise.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

A non-oriented electrical steel sheet according to an embodiment of the present invention includes, in wt %, Si: 2.2 to 4.5%, Mn: 0.5% or less (excluding 0%), Al: 0.001 to 0.5%, Sn: 0.07 to 0.25%, and N: 0.0010 to 0.0090%, and the balance of Fe and inevitable impurities.

Hereinafter, the reason for limiting the components of the non-oriented electrical steel sheet will be described.

Si: 2.20 to 4.50 wt %

Silicon (Si) is an element that increases specific resistance to lower eddy current loss of iron loss. When too little Si is added, it may be difficult to obtain low iron loss characteristics. On the other hand, when too much Si is added, plate breakage may occur. Accordingly, Si may be included in an amount of 2.5 to 4.0 wt %. Specifically, it may be included in an amount of 2.70 to 4.80 wt %. More specifically, it may be included in an amount of 2.90 to 3.50 wt %.

Mn: 0.50 wt % or Less

As an amount of manganese (Mn) added increases, saturation magnetic flux density decreases, and in the present invention, Mn is an austenite forming element, so it is preferable to not be added in order to satisfy a range in which solid phase transformation does not occur. However, when a content of Si is increased, an amount of Mn that does not form austenite may increase even if manganese is increased. Since Mn has an effect of increasing specific resistance and thus iron loss may be improved, it is preferable to add some, so an amount of Mn may be 0.5% or less in a range that does not form austenite, excluding 0%. Specifically, Mn may be included in an amount of 0.01 to 0.50 wt %.

Al: 0.001 to 0.500 wt %

Aluminum (Al) is an element that lowers eddy current loss by increasing specific resistance, but the texture is changed as the content of Al increases. When too little Al is added, it reacts with a trace amount of N to form very fine AlN, which may deteriorate the magnetism. Conversely, when too much Al is added, an Al oxide is distributed on the surface, an Al nitride has a bad effect on magnetism, and it may make the coating adhesion inferior later. Accordingly, Al may be included in an amount of 0.001 to 0.500 wt %. Specifically, it may be included in an amount of 0.010 to 0.400 wt %.

Sn: 0.07 to 0.25 wt %

Tin (Sn) as a grain boundary segregation element suppresses diffusion of nitrogen through the grain boundary, inhibits formation of {111} and {112} textures undesirable to magnetism, and increases {100} and {110} textures favorable to magnetism, so that it is an element added to improve magnetic properties. When too little Sn is added, the above-described effect may not be sufficiently obtained. When too much Sn is added, it suppresses the grain growth to deteriorate magnetism and rollability, and accordingly, Sn may be included in an amount of 0.070 to 0.250 wt %. Specifically, it may be included in an amount of 0.100 to 0.230 wt %.

However, since Sn affects the diffusion of nitrogen, in the embodiment of the present invention, in order to reduce the nitriding interference caused by the segregation of Sn when the nitridation is performed, the nitridation is first performed at a temperature before the segregation of Sn, and then grain growth annealing may be performed.

N: 0.0010 to 0.0090 wt %

Nitrogen (N) forms fine and long AlN precipitates to inhibit the growth of crystal grains, so it is preferable to not be added to a slab, but it may be included in an amount of 0.005 wt % or less in the slab in consideration of an amount unavoidably added in a steelmaking process. Specifically, it may be included in an amount of 0.003 wt % or less in the slab. Specifically, it may be included in an amount of 0.002 wt % or less. As will be described later with respect to the manufacturing process, in the embodiment of the present invention, the content of N is increased through the nitriding process.

Therefore, the non-oriented electrical steel sheet to be finally manufactured may contain 0.0010 to 0.0090 wt % of N. As will be described later, in the embodiment of the present invention, the contents of N in the surface layer portion and the central portion may be different from each other, and the aforementioned content of N means an average value in the entire steel sheet.

The non-oriented electrical steel sheet according to the embodiment of the present invention may further include one or more of C: 0.005 wt % or less and S: 0.003 wt % or leas.

C: 0.005 wt % or Less

Carbon (C) is combined with Ti, Nb, and the like to form carbide to degrade magnetism, and when used after processing from the final product to an electrical product, since iron loss increases due to magnetic aging to decrease efficiency of electrical equipment, it may be included in an amount of 0.005 wt % or less. Specifically, it may be included in an amount of 0.003 wt % or less.

S: 0.003 wt % or Less

Sulfur (S) may be added as low as possible because it forms MnS and CuS, which are fine precipitates, and deteriorates magnetic characteristics by inhibiting grain growth. Accordingly, an upper limit thereof may be limited to 0.003 wt %. Specifically, it may be included in an amount of 0.002 wt % or less.

The non-oriented electrical steel sheet according to the embodiment of the present invention may further include one or more of Sb: 0.2 wt % or less and P: 0.1 wt % or less.

Sb and P have an effect of improving the texture together with the Sn described above, and may be additionally added in the range described above.

The non-oriented electrical steel sheet according to the embodiment of the present invention may further include one or more of Cu: 0.015 wt % or less, Ni: 0.05 wt % or less, Cr: 0.05 wt % or less, Zr: 0.01 wt % or less, Mo: 0.01 wt % or less, and V: 0.01 wt % or less.

Cu, Ni, and Cr react with impurity elements to form fine sulfides, carbides, and nitrides, which have an undesirable effect on magnetism, so that contents thereof are limited to Cu: 0.015 wt % or less, Ni: 0.05 wt % or less, and Cr: 0.05 wt % or less. In addition, since Zr, Mo, and V are strong carbonitride forming elements, it is preferable to not be added as much as possible, but Zr: 0.01 wt % or less, Mo: 0.01 wt % or less, and V: 0.01 wt % or less may be included.

The balance includes Fe and inevitable impurities. The inevitable impurities are impurities mixed in the steelmaking and the manufacturing process of the grain-oriented electrical steel sheet, which are widely known in the field, and thus a detailed description thereof will be omitted. In the embodiment of the present invention, the addition of elements other than the above-described alloy components is not excluded, and various elements may be included within a range that does not hinder the technical concept of the present invention. When the additional elements are further included, they replace the balance of Fe.

As the inevitable impurities, there may be, for example, B and Mg, and B may be managed to 0.002 wt % or less and Mg may be managed to 0.005 wt % or less.

FIG. 1 shows a schematic view of a cross-section of a non-oriented electrical steel sheet according to an embodiment of the present invention.

As shown in FIG. 1, a non-oriented electrical steel sheet 100 according to an embodiment of the present invention includes a surface layer portion 20 present in an inner direction from a surface of the steel sheet and a central portion 10 present in the surface layer portion 20.

In the embodiment of the present invention, contents of nitrogen in the central portion 10 and the surface layer portion 20 are different by nitriding, and the nitride is concentrated in the surface layer portion 20, thereby preventing deterioration of low-frequency iron loss. At the same time, a grain size of the surface layer portion 20 is refined by the nitride of the surface layer portion 20, so that high-frequency iron loss may be improved. In addition, the texture is improved, so that the magnetic flux density may also be improved.

The surface layer portion 20 is present to have a thickness of 10 to 20% of the entire thickness of the steel sheet. Since the surface layer portion 20 may exist at both sides of the steel sheet, the central portion 10 is present to have a thickness of 60 to 80% of the entire thickness of the steel sheet. Specifically, the surface layer portion 20 may exist to have a thickness of 15% of the entire thickness of the steel sheet.

By nitriding in the embodiment of the present invention, the contents of nitrogen in the central portion 10 and the surface layer portion 20 are different. Specifically, the central portion 10 may include 0.005 wt % or less of N. This is the same as the content of N in the slab, meaning that nitrogen does not substantially penetrate to the central portion 10 in the nitriding process.

The surface layer portion 20 largely includes nitrogen of 0.0010 wt % or more compared to the nitrogen content of the central portion 10. As described above, by varying the nitrogen content, the nitride may be concentrated in the surface layer portion 20. A gradient of nitrogen content may exist in a thickness direction in the surface layer portion 20 and the central portion 10, and the above-described nitrogen range means an average in the entire thickness.

As described above, 0.0010 to 0.0090 wt % of nitrogen may be included in the entire electrical steel sheet 100.

As described above, as the nitriding is intensively performed on the surface layer portion 20, the nitride may be precipitated on the surface layer portion 20. Specifically, an average particle diameter of the nitride may be 10 to 100 nm. The nitride may be an (Al, Si)N, (Al, Si, Mn)N, or AlN.

A grain size of the surface layer portion 20 is refined by the nitride of the surface layer portion 20, while a grain size of the central portion 10 are not refined, so their average grain sizes may be different from each other.

Specifically, the surface layer portion 20 has an average grain size of 60 μm or less, and the central portion 10 has an average grain of 70 to 300 μm. As described above, by differently controlling the grain sizes, the low-frequency iron loss and high-frequency iron loss may be improved. When the annealing temperature is too high and abnormal grain growth occurs in the central grain, bad grains are unintentionally grown, and the iron loss may deteriorate. Accordingly, the central grain is controlled to be less than 300 μm. Specifically, an average grain size of the central portion may be 70 to 130 μm. More specifically, an average grain size of the surface layer portion 20 may be 20 to 55 μm, and the average grain size of the central portion 10 may be 70 to 120 μm. The grain size refers to a diameter of an imaginary circle having the same area as the grain size. Measurement can be performed based on a surface parallel to a rolling surface (ND surface).

The average grain size of the central portion 10 may be twice or more the average grain size of the surface layer portion 20.

On the other hand, the central portion 10 has improved texture, so that the magnetic flux density may also be improved.

Among the grains of the central portion 10, a fraction of grains having an angle between the {100} plane and the rolling surface of 15° or less may be 30% or more.

In the embodiment of the present invention, this value may be increased to 30% or more by performing nitriding treatment together with Sn addition. Accordingly, a significant improvement in the magnetic flux density may be achieved. Specifically, the fraction of grains having the angle between the {100} plane and the rolling surface of 15° or less may be 30% to 50%.

Among the grains of the central portion 10, a fraction of grains having an orientation deviated by 15° or less from a {001}<012> orientation may be 20% or more.

The intensity of the {001}<012> orientation of the central portion 10 may be 7 times or more random when expressed as an orientation distribution function (ODF).

As described above, as the texture of the {001}<012> orientation is developed, a circumferential characteristic may be very good. Specifically, among the grains of the central portion 10, a fraction of grains having an orientation deviated by 15° or less from a {001}<012> orientation may be 20% to 40%.

Among the grains of the central portion, a fraction of grains having an angle between the {111} plane and the rolling surface of 15° or less may be 25% or less.

Based on the RD direction, the best orientation for magnetism is the <100> orientation, followed by <110>, and finally <111> is the worst orientation.

The non-oriented electrical steel sheet has an ideal magnetic value when <100> is uniformly arranged in the surface direction of the steel sheet, and in this case, when the <112> orientation in the surface direction is strongly developed, the magnetism significantly deteriorates. In addition, considering a volume fraction of grains in which the angle between the {112}plane and the rolling plane is 15° or less in the non-oriented electrical steel sheet including a high Si content without phase transformation, it exists more than in the {111} orientation. This orientation also causes a lot of orientations bad for magnetism in the rolling surface direction, so it is necessary to lower the fraction of these orientations. Specifically, the fraction of grains having the angle between the {111} plane and the rolling surface of 15° or less may be 10% to 25%.

As described above, by differently controlling the grain size and improving the texture, the magnetism may be improved. When the magnetic flux density is divided by this saturation magnetic flux density value according to the Si content, a degree of formation of the texture favorable to the magnetism through process improvement may be evaluated. That is, even if the high magnetic flux density may be obtained in a state of a low silicon content, since the iron loss has a very poor characteristic, the degree of the formation of the texture having the excellent magnetism with the low iron loss and the high magnetic flux density should be evaluated as a $B_{50}/B_s$ value. Specifically, the non-oriented electrical steel sheet according to the embodiment of the present invention may satisfy $B_{50}/B_s \geq 0.84$.

($B_{50}$ represents a magnitude (Tesla) of magnetic flux density induced when a magnetic field of 5000 A/m is added, and Bs represents a saturation magnetic flux density value (Tesla)).

Bs can be calculated as follows.

$$Bs=2.1561-0.0413\times[Si]-0.0198\times[Mn]-0.0604\times[Al]$$

Herein, [Si], [Mn], and [Al] represent contents (wt %) of Si, Mn, and Al in the steel sheet, respectively.

In the non-oriented electrical steel sheet according to the embodiment of the present invention, $W_{15/50}$ may be 1.94 W/kg or less, and $W_{10/1000}$ may be 43 W/kg or less.

($W_{15/50}$ represents an average loss in the rolling direction and the direction perpendicular to the rolling direction when a magnetic flux density of 1.5 Tesla is induced at a frequency of 50 Hz, and $W_{10/1000}$ represents an average loss in the rolling direction and the direction perpendicular to the rolling direction when a magnetic flux density of 1.0 Tesla is induced at a frequency of 1000 Hz).

A manufacturing method of a non-oriented electrical steel sheet according to an embodiment of the present invention includes: hot-rolling a slab that includes, in wt %, Si: 2.2 to 4.5%, Mn: 0.5% or less (excluding 0%), Al: 0.001 to 0.5%, Sn: 0.07 to 0.25%, and N: 0.005% or less (excluding 0%), and the balance of Fe and inevitable impurities to manufacture a hot-rolled sheet; cold-rolling the hot-rolled sheet to manufacture a cold-rolled sheet; and final annealing the cold-rolled sheet.

Hereinafter, respective steps will be specifically described.

First, the slab is hot-rolled.

The alloy components of the slab have been described in the alloy components of the above-described non-oriented electrical steel sheet, so duplicate descriptions thereof will be omitted. Since the alloy compositions are not substantially changed during the manufacturing process of the non-oriented electrical steel sheet, the alloy compositions of the non-oriented electrical steel sheet and the slab are substantially the same.

Specifically, the slab may include, wt %, Si: 2.2 to 4.5%, Mn: 0.5% or less (excluding 0%), Al: 0.001 to 0.5%, Sn: 0.07 to 0.25%, and N: 0.005% or less (excluding 0%), and the balance of Fe and inevitable impurities.

The slab may have a component that does not form an austenite phase in a temperature range before a solid state.

Other additional elements of the slab have been described in the alloy components of the non-oriented electrical steel sheet, so duplicate descriptions thereof will be omitted.

The slab may be heated before hot-rolling. The heating temperature of the slab is not limited, but the slab may be heated at 1050 to 1200° C. When the slab heating temperature is too high, precipitates such as nitride, carbide, and sulfide present in the slab are re-dissolved and then finely precipitated during hot-rolling and annealing, thereby inhibiting grain growth and reducing magnetism.

Next, the slab is hot-rolled to manufacture the hot-rolled sheet. A thickness of the hot-rolled sheet may be 2.0 to 2.3 mm. In the manufacturing of the hot-rolled sheet, a finish rolling temperature may be 800° C. or higher. Specifically, it may be 800 to 1000° C. The hot-rolled sheet may be wound at temperatures of 700° C. or less.

After the manufacturing of the hot-rolled sheet, hot-rolled-sheet-annealing the hot-rolled sheet may be further included. In this case, a temperature of the hot-rolled-sheet-annealing may be 900 to 1150° C. When the temperature of the hot-rolled-sheet-annealing is too low, Sn may be excessively contained in the steel and grain growth may decrease. When the temperature of the annealing is too high, surface defects may occur. The hot-rolled sheet annealing is performed in order to increase the orientation favorable to magnetism as required, and it may be omitted. The annealed hot-rolled sheet may be pickled.

Next, the hot-rolled sheet is cold-rolled to manufacture a cold-rolled sheet. The cold-rolling is finally performed to a thickness of 0.10 mm to 0.35 mm. As necessary, the cold-rolling may be performed once, or two or more times with intermediate annealing therebetween. In this case, a temperature of the intermediate annealing may be 850 to 1150° C.

In the cold-rolling, a final reduction ratio may be adjusted to 60% to 88%. When the cold-rolling reduction ratio is too low, the Goss orientation develops, and when it is too high, development of the {111}<112> orientation becomes stronger, so it may be adjusted within the above-mentioned range. When including one cold-rolling step, the reduction ratio of the one cold-rolling step is the final reduction ratio, and when the cold-rolling is performed twice or more, the reduction ratio in the last cold-rolling is the final reduction ratio.

Next, the cold-rolled sheet is finally annealed. As described above, it is possible to improve magnetism by introducing a nitriding process in the embodiment of the present invention.

Specifically, the final annealing step includes a step of nitriding-annealing and a step of annealing grain growth.

When the temperature is increased for the nitriding-annealing of the cold-rolled sheet, the temperature increase rate from 300° C. to the nitriding-annealing temperature may be 30° C./s or more. In order to suppress the formation of the {111} and {112} orientations and grow the {100} orientation rather than the Goss orientation, an appropriate content of Sn, an appropriate cold reduction ratio, and a temperature increase rate are very important. This is because, when the temperature increase rate is increased, the growth of the {111} or {112} orientation is suppressed, so it is advantageous for the growth of the {100} orientation. In addition, the temperature increase rate in a region including 300 to 850° C., which is a temperature at which recovery and recrystallization occurs, is particularly important, and in this case, when the temperature increase rate is 30° C./s or more, the growth of the {100} orientation appears. Specifically, it may be 100° C./s or more.

The temperature of the nitriding-annealing step may be 700 to 850° C. When the nitriding treatment temperature is too high, nitriding may be difficult due to Sn segregation or formation of an oxide layer. When it is too low, a diffusion amount may be too small. Specifically, it may be 750 to 800° C.

The nitriding-annealing step may be performed in an atmosphere including ammonia, nitrogen, and hydrogen.

The amount of nitriding may be increased from 10 to 80 ppm by weight through the nitriding-annealing. When the nitriding temperature is low, the nitrides are mostly present in the surface layer portion, but when the amount of nitriding is too large, the low-frequency iron loss may deteriorate. When the amount of nitriding is too small, there may be no effect of refining the grain in the surface layer portion. Specifically, the amount of nitriding may be 15 to 50 ppm by weight. The amount of nitriding is calculated based on the thickness of the entire electrical steel sheet 100 including the surface layer portion 20 and the center portion 10.

The annealing of the grain growth may be performed at 960 to 1200° C. Since the content of Sn is high and the grain growth is suppressed, the final annealing may be performed within the above-described range.

The annealing time of the grain growth may be 65 seconds to 900 seconds. When the annealing time is too short, since the Sn content is high, the grain growth may be hindered by grain boundary segregation, and the size of the grains may be reduced. When the annealing time is too long, continuous annealing may become difficult. In addition, since the economic feasibility increases when the annealing time is shortened, the annealing time of the grain growth may be 65 seconds to 330 seconds from the viewpoint of increasing the economic feasibility.

It is preferable that it includes hydrogen in the atmosphere during the annealing of the grain growth and the oxidation degree ($PH_2O/PH_2$) is 0.015 or less. (Here, $PH_2$ is a partial pressure of hydrogen, and $PH_2O$ is a partial pressure of water vapor.)

In addition, during the annealing of the grain growth, it may be performed in a nitrogen and hydrogen atmosphere, and it may include 51 vol % or more of hydrogen.

After the final annealing, an insulating film may be formed. The insulating film may be formed as an organic, inorganic, or organic/inorganic composite film, and it may be formed with other insulating coating materials.

Hereinafter, the present invention will be described in more detail through examples. However, the examples are only for illustrating the present invention, and the present invention is not limited thereto.

Example 1

A slab including, in wt %, C: 0.0025%, Mn: 0.07%, Al: 0.028% Si, 3.4%, S: 0.0015%, N: 0.0005%, the balance of Fe and other inevitable impurities, and a content of Sn in Table 1, was prepared. The slab was reheated at 1150° C. and then hot-rolled to 2.0 mm to manufacture a hot-rolled steel sheet. The hot-rolled steel sheet was annealed at 1100° C. for 100 seconds, and then slowly cooled at 750° C. and then air-cooled. After that, the steel sheet was pickled and then cold-rolled to 0.27 mm.

For final annealing, grain growth annealing was performed after nitriding-annealing, and the temperature of the nitriding-annealing and the nitriding amount were as follows. The temperature of the grain growth was also changed as shown in Table 1. For the time of the grain growth, the final annealing was performed for 300 seconds to manufacture an electrical steel sheet. In this case, the temperature increase rate up to the nitriding treatment temperature was as shown in Table 1.

Magnetism was measured for the electrical steel sheet manufactured as described above, and in this case, the magnetism of the steel sheet was measured in the rolling direction and the direction perpendicular to the rolling direction by using a 60×60 $mm^2$ size single sheet measuring device, and the measured results are expressed as an average value. For the texture, the azimuth fraction was calculated through EBSD measurement, and the results are shown in Table 2 below.

The surface layer portion is up to a thickness of 15% from each of both surfaces, and the central portion is an inner portion of the surface layer portion.

TABLE 1

| | Sn content (wt %) | Nitriding annealing temperature (° C.) | Amount of nitriding (ppm) | Temperature increase rate to nitriding-annealing temperature (° C./s) | Grain growth annealing temperature (° C.) | Nitrogen content of surface layer portion (wt %) | Grain size of surface layer portion (μm) | Grain size of central portion (μm) |
|---|---|---|---|---|---|---|---|---|
| Comparative Material 1 | — | unprocessed | 0 | 10 | 1050 | 0.0005 | 122 | 124 |
| Comparative Material 2 | 0.105 | unprocessed | 0 | 10 | 1020 | 0.0005 | 102 | 104 |
| Comparative Material 3 | 0.105 | unprocessed | 0 | 30 | 1020 | 0.0005 | 97 | 96 |
| Comparative Material 4 | 0.105 | 770 | 25 | 10 | 1020 | 0.0088 | 32 | 46 |
| Inventive Material 1 | 0.105 | 770 | 25 | 30 | 1020 | 0.0088 | 31 | 72 |
| Inventive Material 2 | 0.105 | 770 | 25 | 30 | 1100 | 0.0088 | 43 | 105 |
| Inventive Material 3 | 0.105 | 770 | 25 | 30 | 1150 | 0.0088 | 48 | 120 |
| Inventive Material 4 | 0.105 | 770 | 25 | 120 | 1150 | 0.0088 | 46 | 116 |
| Comparative Material 5 | 0.105 | 770 | 4 | 30 | 1150 | 0.0018 | 105 | 140 |
| Inventive Material 5 | 0.105 | 770 | 15 | 30 | 1120 | 0.0055 | 51 | 107 |
| Inventive Material 6 | 0.105 | 770 | 40 | 30 | 1150 | 0.0138 | 35 | 110 |
| Comparative Material 6 | 0.105 | 770 | 105 | 30 | 1150 | 0.0355 | 35 | 47 |
| Comparative Material 7 | 0.105 | 770 | 2 | 30 | 1250 | 0.0006 | 100 | 345 |

TABLE 2

| | Iron loss W15/50 (W/kg) | Magnetic flux density B50 (T) | Iron loss W10/1000 (W/kg) | Tensile strength (MPa) |
|---|---|---|---|---|
| Comparative Material 1 | 1.97 | 1.66 | 49.1 | 383 |
| Comparative Material 2 | 1.95 | 1.67 | 48.4 | 392 |
| Comparative Material 3 | 1.78 | 1.73 | 46.2 | 395 |
| Comparative Material 4 | 2.12 | 1.7.0 | 42.0 | 450 |
| Inventive Material 1 | 1.84 | 1.73 | 41.5 | 450 |
| Inventive Material 2 | 1.81 | 1.72 | 40.3 | 444 |
| Inventive Material 3 | 1.77 | 1.71 | 39.3 | 438 |
| Inventive Material 4 | 1.74 | 1.74 | 37.4 | 44 |
| Comparative Material 5 | 1.79 | 1.73 | 44.6 | 398 |
| Inventive Material 5 | 1.75 | 1.73 | 41.8 | 434 |
| Inventive Material 6 | 1.86 | 1.71 | 42.0 | 460 |
| Comparative Material 6 | 2.21 | 1.67 | 53.1 | 480 |
| Comparative Material 7 | 2.21 | 1.67 | 47.1 | 370 |

As shown in Table 1 and Table 2, it can be confirmed that both the low-frequency iron loss and the high-frequency iron loss were improved when the temperature increase rate was maintained high and the grain sizes were differently controlled in the surface layer portion and in the central portion through the nitriding. In addition, it can be confirmed that the strength was also improved.

This has realized improvement of the high-frequency iron loss by controlling the low-frequency iron loss by controlling the texture, by preventing the low-frequency iron loss deterioration due to the grain size growth of the central portion, and by reducing the grain size of the surface layer portion, and the reduction in the grain size of the surface layer portion and the precipitates due to nitriding may contribute to an increase in motor efficiency through an increase in tensile strength.

On the other hand, it can be confirmed that Comparative Material 1 to Comparative Material 3 did not undergo the nitriding-annealing, so that the grain sizes of the surface layer portion and the central portion were not properly adjusted, and the magnetism was inferior.

It can be seen that Comparative Material 4 had a small grain size at the center portion and the magnetism was inferior because the temperature increase rate was too low.

It can be confirmed that Comparative Material 5 had a small amount of nitriding, so that it had a large grain size in the surface layer portion, poor high-frequency iron loss, and poor strength.

It can be seen that Comparative Material 6 had a small grain size at the center portion and the magnetism was inferior because the amount of nitriding was too high.

It can be confirmed that Comparative Material 7 had an excessively high grain growth annealing temperature, so that the grain size in the center portion was too large, and the magnetism and strength were inferior.

FIG. 1 shows the result of observing the cross-section of the steel sheet of Inventive Material 1. As shown in FIG. 1, it can be confirmed that the grain sizes of the surface layer portion and the central portion were different from each other.

Example 2

A slab composed of, in wt %, C: 0.002%, Mn: 0.3%, Al: 0.04%, N: 0.0005%, and of Si and Sn whose contents were changed as shown in Table 3, and of the balance of Fe and other inevitable impurities, was prepared.

The slab was reheated at 1150° C. and then hot-rolled to 1.6 mm to manufacture a hot-rolled steel sheet. The hot-rolled steel sheet was annealed at 1100° C. for 100 seconds, and then slowly cooled at 750° C. and then air-cooled. After that, the steel sheet was pickled and then cold-rolled to 0.27 mm. In the final annealing, the following three comparative examples were not nitrided, and the remaining comparative examples were nitrided at 780° C. and at 30 ppm and then final annealed in an atmosphere (in this case, a $PH_2O/PH_2$ value of the oxidation degree is 0.00076) of 95% of hydrogen, 5% of nitrogen, and a dew point of −25° C. and at 1150° C. for 300 seconds to manufacture an electrical steel sheet. In this case, the temperature increase rate from 300 to 780° C. was as shown in Table 3.

The close contacting property was evaluated by a 15 mmΦ bending test. When peeling did not occur, it was indicated as good, and when peeling occurred, it was indicated as bad.

As shown in Table 3 and Table 4, it can be confirmed that when Si and Sn were properly included and the amount of nitriding was appropriate, {111} decreased, {100} orientation increased, and particularly {100}<012> value increased, to improve the magnetic flux density.

It could be confirmed that Comparative Examples 8, 9, and 10 did not properly include Si and Sn and did not undergo the nitriding-annealing, so that the texture was not improved and the magnetism was inferior.

It can be confirmed that Comparative Example 11 did not properly include Sn, so that the texture was not improved and the magnetism was inferior. In addition, it can be confirmed that the close contacting property was inferior.

It can be confirmed that in Comparative Example 12, the temperature increase rate was too low, so that the texture was not improved, and the magnetism was inferior.

Example 3

A slab composed of, in wt %, C: 0.002%, Si: 3.35%, Al: 0.035%, Sn: 0.13%, Mn: 0.3%, N: 0.001%, S: 0.0009%, Cu: 0.007%, and the balance of Fe and other inevitable impurities, was prepared.

The slab was reheated at 1150° C. and then hot-rolled to 2.0 mm to manufacture a hot-rolled steel sheet. The cold-

TABLE 3

| Remarks | Si wt % | Sn wt % | Temperature increase rate (° C./s) | Amount of nitriding (ppm) | Nitrogen content of surface layer portion (wt %) | Grain size of surface layer portion (μm) | Grain size of central portion (μm) |
|---|---|---|---|---|---|---|---|
| Comparative Example 8 | 1.8 | 0.15 | 34 | 0 | 0.0005 | 87 | 80 |
| Comparative Example 9 | 3.4 | 0 | 34 | 0 | 0.0005 | 141 | 155 |
| Comparative Example 10 | 3.4 | 0.04 | 34 | 0 | 0.0005 | 105 | 107 |
| Inventive Example 7 | 3.4 | 0.12 | 34 | 30 | 0.0048 | 49 | 115 |
| Inventive Example 8 | 3.4 | 0.21 | 34 | 30 | 0.0048 | 38 | 101 |
| Comparative Example 11 | 3.4 | 0.38 | 34 | 30 | 0.0048 | 30 | 65 |
| Comparative Example 12 | 3.4 | 0.11 | 4 | 30 | 0.0048 | 72 | 90 |

TABLE 4

| Remarks | Iron loss $W_{15/50}$ (W/kg) | Iron loss $W_{10/1000}$ (W/kg) | Magnetic flux density $B_{50}$ (T) | $B_{50}/B_s$ | $F_{\{100\}}$ (%) | {100}<012> Fraction (%) | $F_{\{111\}}$ (%) | Close contacting property |
|---|---|---|---|---|---|---|---|---|
| Comparative Example 8 | 2.9 | 65 | 1.71 | 0.825 | 11 | 4 | 33 | Good |
| Comparative Example 9 | 1.97 | 48 | 1.66 | 0.827 | 14 | 5 | 27.5 | Good |
| Comparative Example 10 | 1.96 | 47 | 1.66 | 0.827 | 15 | 6 | 25.4 | Good |
| Inventive Example 7 | 1.7 | 39 | 1.73 | 0.862 | 43 | 32 | 10.3 | Good |
| Inventive Example 8 | 1.86 | 38 | 1.72 | 0.857 | 33 | 24 | 13.1 | Good |
| Comparative Example 11 | 2.02 | 46 | 1.68 | 0.837 | 9.5 | 3 | 11.8 | Poor |
| Comparative Example 12 | 1.98 | 46 | 1.67 | 0.832 | 16 | 9 | 29 | Good | rolled steel sheet and the non-cold-rolled steel sheet were annealed for this steel sheet to the thickness shown in Table 5 below. It was performed at 1100° C. as an annealing condition, and then slowly cooled to 750° C., and then air-cooled. Thereafter, the steel sheet was pickled, and cold-rolled to 0.27 mm, and then the cold-rolled steel sheet was final annealed.

In the final annealing of the cold-rolled steel sheet, the temperature increase rate was increased to 40° C./s, the nitriding-annealing was performed at 780° C. with a nitriding amount of 35 ppm, and then the grain growth annealing was performed at the temperature of Table 5 for 300 seconds.

TABLE 5

| Remarks | Thickness hot-rolled and then cold-rolled (mm) | Grain growth annealing temperature (° C.) | Nitrogen content of surface layer portion (wt %) | Grain size of surface layer portion (μm) | Grain size of central portion (μm) | F{100} (%) | F{111} (%) |
|---|---|---|---|---|---|---|---|
| Comparative Example 13 | 0.9 | 950 | 0.006 | 35 | 55 | 7.3 | 25 |
| Inventive Example 9 | 0.9 | 1100 | 0.006 | 45 | 109 | 39 | 11 |
| Inventive Example 10 | 0.9 | 1150 | 0.006 | 55 | 119 | 41 | 10 |
| Comparative Example 14 | 0.9 | 1250 | 0.006 | 75 | 362 | 12 | 13 |
| Inventive Example 16 | 2.0 (direct annealing of hot-rolled sheet) | 1100 | 0.006 | 65 | 120 | 15 | 19 |

TABLE 6

| Remarks | Iron loss $W_{15/50}$ (W/kg) | Iron loss $W_{10/1000}$ (W/kg) | Magnetic flux density $B_{50}$ (T) | $B_{50}/B_s$ | Close contacting property |
|---|---|---|---|---|---|
| Comparative Example 13 | 2.32 | 41 | 1.64 | 0.816 | Good |
| Inventive Example 9 | 1.69 | 35 | 1.72 | 0.856 | Good |
| Inventive Example 10 | 1.74 | 36 | 1.72 | 0.856 | Good |
| Comparative Example 14 | 2.11 | 46 | 1.67 | 0.831 | Good |
| Inventive Example 16 | 1.97 | 41 | 1.72 | 0.856 | Good |

As shown in Table 5 and Table 6, it can be confirmed that when the grain growth annealing temperature was appropriately adjusted, {111} orientation decreased, {100} orientation increased, and the magnetism was improved.

On the other hand, it can be confirmed that in Comparative Example 13, the grain growth annealing temperature was too low, the texture was not improved, and the magnetism was inferior.

It can be confirmed that in Comparative Example 14, the grain growth annealing temperature was too high, the texture was not improved, and the magnetism was inferior.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described embodiments are for illustrative purposes only, and the scope of the present invention is not limited thereto.

| Description of symbols | |
|---|---|
| 100: non-oriented electrical steel sheet, | 10: central portion, |
| 20: surface layer portion | |

The invention claimed is:

1. A non-oriented electrical steel sheet, including, in wt %, Si: 2.2 to 4.5%, Mn: 0.5% or less (excluding 0%), Al: 0.001 to 0.5%, Sn: 0.07 to 0.25%, and N: 0.0010 to 0.0090%, and the balance of Fe and inevitable impurities; and a surface layer portion existing in an inner direction from a surface of the steel sheet and a central portion existing inside the surface layer portion, wherein the central portion includes N at 0.005 wt % or less, and the surface layer portion further includes N at 0.001 wt % or more compared to the central portion;

the surface layer portion has an average grain size of 60 μm or less, and the central portion has an average grain size of 70 to 300 μm, and wherein among grains of the central portion, a fraction of grains having an angle between a {100} plane and a rolling surface of 150 or less is 30% or more.

2. The non-oriented electrical steel sheet of claim 1, further comprising
one or more of C: 0.005 wt % or less and S: 0.003 wt % or less.

3. The non-oriented electrical steel sheet of claim 1, further comprising
one or more of Sb: 0.2 wt % or less and P: 0.1 wt % or less.

4. The non-oriented electrical steel sheet of claim 1, further comprising
at least one of Cu: 0.015 wt % or less, Ni: 0.05 wt % or less, Cr: 0.05 wt % or less, Zr: 0.01 wt % or less, Mo: 0.01 wt % or less, and V: 0.01 wt % or less.

5. The non-oriented electrical steel sheet of claim 1, wherein
the surface layer portion includes a nitride, and an average particle diameter of the nitride is 10 to 100 nm.

6. The non-oriented electrical steel sheet of claim 1, wherein
an average grain size of the central portion is twice or more an average grain size of the surface layer portion.

7. The non-oriented electrical steel sheet of claim 1, wherein
among grains of the central portion, a fraction of grains having an orientation deviated by 150 or less from a {001}<012> orientation is 20% or more.

8. The non-oriented electrical steel sheet of claim 1, wherein
among grains of the central portion, a fraction of grains having an angle between a {111} plane and a rolling surface of 15° or less is 25% or less.

9. The non-oriented electrical steel sheet of claim 1, wherein
$B_{50}/B_s \geq 0.84$ is satisfied
($B_{50}$ represents a magnitude (Tesla) of magnetic flux density induced when a magnetic field of 5000 A/m is added, and $B_S$ represents a saturation magnetic flux density value (Tesla)).

10. The non-oriented electrical steel sheet of claim 1, wherein
$W_{15/50}$ is 1.94 W/kg or less, and $W_{10/1000}$ is 43 W/kg or less
($W_{15/50}$ represents an average loss in a rolling direction and a direction perpendicular to the rolling direction when a magnetic flux density of 1.5 Tesla is induced at a frequency of 50 Hz, and $W_{10/1000}$ represents an average loss in the rolling direction and the direction perpendicular to the rolling direction when a magnetic flux density of 1.0 Tesla is induced at a frequency of 1000 Hz).

\* \* \* \* \*